United States Patent [19]

Kanda

[11] Patent Number: 5,316,369
[45] Date of Patent: May 31, 1994

[54] SEAT ARM REST CAPABLE OF HOUSING TELEVISION RECEIVER THEREIN

[75] Inventor: Yasushi Kanda, Kanagawa, Japan

[73] Assignee: Koito Industries, Ltd., Kanagawa, Japan

[21] Appl. No.: 58,809

[22] Filed: May 10, 1993

Related U.S. Application Data

[63] Continuation of Ser. No. 573,124; filed as PCT/JP90/00151, Feb. 7, 1990, abandoned.

[30] Foreign Application Priority Data

Feb. 15, 1989 [JP] Japan .................................. 1-15794

[51] Int. Cl.⁵ .............................................. A47C 7/68
[52] U.S. Cl. ............................... 297/194; 297/217; 297/135
[58] Field of Search ............ 297/194, 188, 145, 217, 297/411.2, 135; 248/118, 118.5, 278; 16/326, 340

[56] References Cited

U.S. PATENT DOCUMENTS

| | | | |
|---|---|---|---|
| 1,742,698 | 1/1930 | Fellows | 16/340 |
| 2,879,835 | 3/1959 | Miller | 297/217 |
| 3,583,760 | 6/1971 | McGregor | 297/145 |
| 3,608,101 | 9/1971 | Castro et al. | 297/217 X |
| 3,632,161 | 1/1972 | Arfaras | 297/194 X |
| 3,969,788 | 7/1976 | McCullough | 16/326 |
| 4,584,603 | 4/1986 | Harrison | 297/217 X |
| 4,602,889 | 7/1986 | Mu-Shan | 16/326 X |
| 4,756,572 | 7/1988 | Dykstra et al. | 297/145 X |
| 5,000,511 | 3/1991 | Shichijo et al. | 297/191 |

FOREIGN PATENT DOCUMENTS

| | | | |
|---|---|---|---|
| 3331946 | 5/1984 | Fed. Rep. of Germany | 297/194 |
| 959641 | 3/1950 | France | 297/194 |
| 452192 | 10/1949 | Italy | 297/194 |
| 50-6625 | 3/1975 | Japan . | |
| 116549 | 8/1980 | Japan . | |
| 55-116549 | 8/1980 | Japan . | |
| 57-204921 | 12/1982 | Japan . | |
| 592431 | 10/1977 | Switzerland | 297/411 |
| 470700 | 8/1937 | United Kingdom | 297/145 |

*Primary Examiner*—Kenneth J. Dorner
*Assistant Examiner*—Milton Nelson, Jr.
*Attorney, Agent, or Firm*—Sughrue, Mion, Zinn, Macpeak & Seas

[57] ABSTRACT

An armrest (1) comprising an armrest body provided with a cavity (2) under a cocktail tray to house a television set (4), and a hinge mechanism (6) provided with a turning unit (10) and attached to the upper front end of the armrest body so that the turning unit (10) can be turned into and out of the cavity (2). A television set is mounted on the extremity of the turning unit (10). The television set (4) is held in an operating position by the turning unit (10). When not used, the television set (4) is housed in the cavity (2). The armrest (1) capable of housing the television set (4) is applied to seats to be installed on aircraft, railway rolling stocks and vehicles including buses.

12 Claims, 10 Drawing Sheets

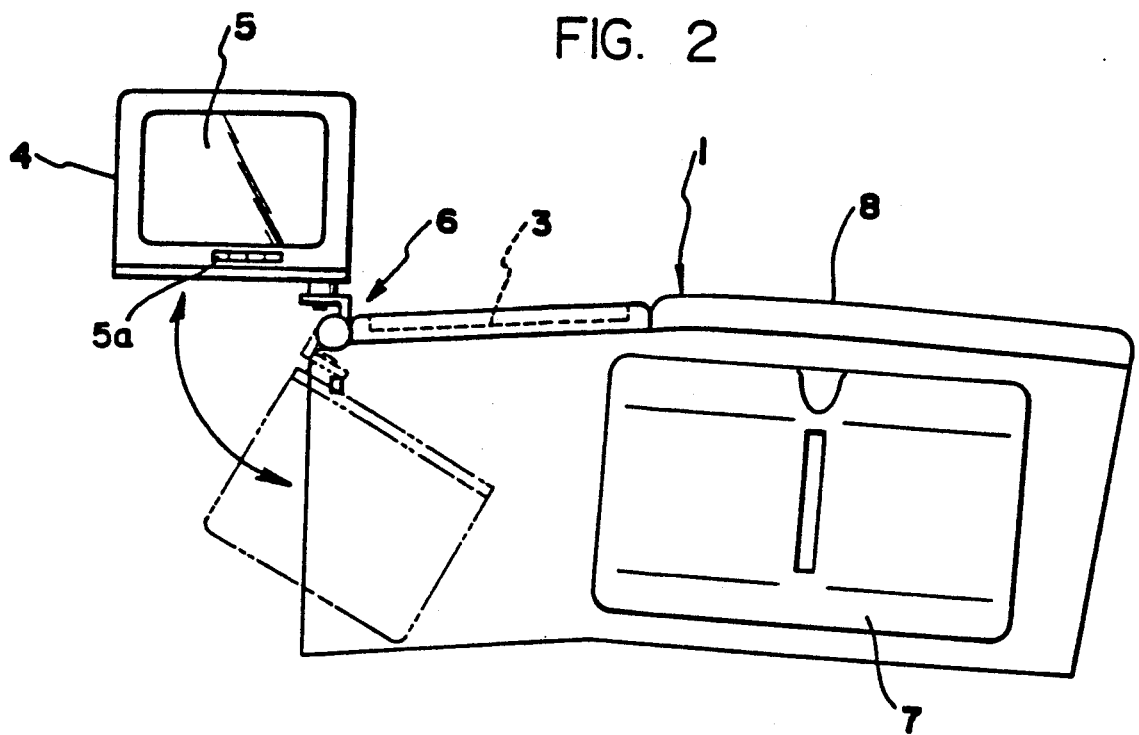
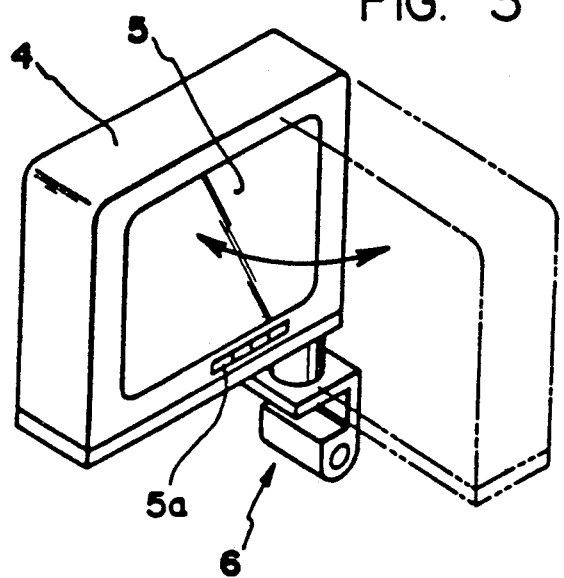

5,316,369

SEAT ARM REST CAPABLE OF HOUSING TELEVISION RECEIVER THEREIN

This application is a continuation of Ser. No. 07/573,124 filed PCT/JP90/00151, Feb. 7, 1990, now abandoned.

TECHNICAL FIELD

The present invention relates to an armrest for a seat to be installed on aircraft or a vehicle and, more particularly, to an armrest for such a seat, having a cavity or cavities for housing a personal television set or television sets in its front lower portion.

BACKGROUND ART

Generally, an armrest, such as a center armrest, for a seat to be installed on aircraft or a vehicle is provided with a cocktail tray in its front upper portion, retractable tables under an armrest cushion, and tiltable pockets for containing small personal effects, such as glasses and a cigarette package, on its side walls.

Such a conventional center armrest, however, is unable to be provided with a liquid crystal television set because the cocktail tray or the table interferes with the liquid crystal television set. A conventional side armrest, similarly to the center armrest, is unable to be provided with a television set.

The present invention has been made in view of the foregoing problems in the conventional armrest, and it is therefore an object of the present invention to provide an armrest for a seat, capable of holding a television set having a comparatively large display unit for free personal use and provided in its front portion with a cavity capable of snugly housing the television set.

DISCLOSURE OF THE INVENTION

To achieve the foregoing object, the present invention provides an armrest for a seat to be installed on aircraft or a vehicle, comprising an armrest body provided with a cavity for housing a television set under a cocktail tray formed in its front portion, a hinge mechanism attached to the armrest body at the front upper end of the cavity and provided with a friction mechanism, and a turning unit supported on the hinge mechanism so as to be turned into the cavity and supporting the television for tilting and turning motions.

The friction mechanism of the hinge mechanism may be such means including a hinge pin, a disk spring mounted on the hinge pin, and an adjusting nut screwed on the hinge pin; means including a hinge pin support or supports, one or a plurality of curved plate springs provided in the hinge pin support or supports so as to apply pressure to the circumference of the hinge pin; means including a hinge pin support or supports filled with a liquid having a high viscosity; means including a hinge pin support, and a coil spring placed on the hinge pin within the hinge pin support and having one end engaging the hinge pin and the other end engaging the hinge pin support; or means including a hinge pin support, a hinge pin provided with a cam at one end thereof received in the hinge pin support, another hinge pin provided with a cam to engage the cam of the former hinge pin, and an elastic member for axially applying pressure to one of the hinge pins.

In using the television set, the television set supported on the turning unit is turned on the hinge mechanism to take out the television set through the opening of the cavity, the turning unit is turned in a horizontal plane so that the display unit of the television set is turned toward the person seated on the seat in a normal sitting position, the television set is tilted properly and held in place on the turning unit so that the person seated on the seat is able to enjoy television.

Since the hinge mechanism is provided with the friction mechanism, the television set never falls accidentally.

The armrest enables the person seated on the seat to use the table and the cocktail tray incorporated into the armrest, while the person is enjoying television.

When the person seated on the seat does not want to enjoy television, the television set can be housed in the cavity of the armrest to facilitate the actions of the person.

BRIEF DESCRIPTION OF THE DRAWINGS

FIG. 2 is a side elevation of assistance in explaining a manner of taking out the television set from the cavity of the armrest, showing an essential portion of the armrest;

FIG. 3 perspective view of assistance in explaining a manner of turning the television set taken out from the cavity of the armrest;

BEST MODE FOR CARRYING OUT THE INVENTION

Armrests in preferred embodiments according to the present invention for a seat, capable of housing a television set will be described hereinafter with reference to the accompanying drawings.

Figure 1:
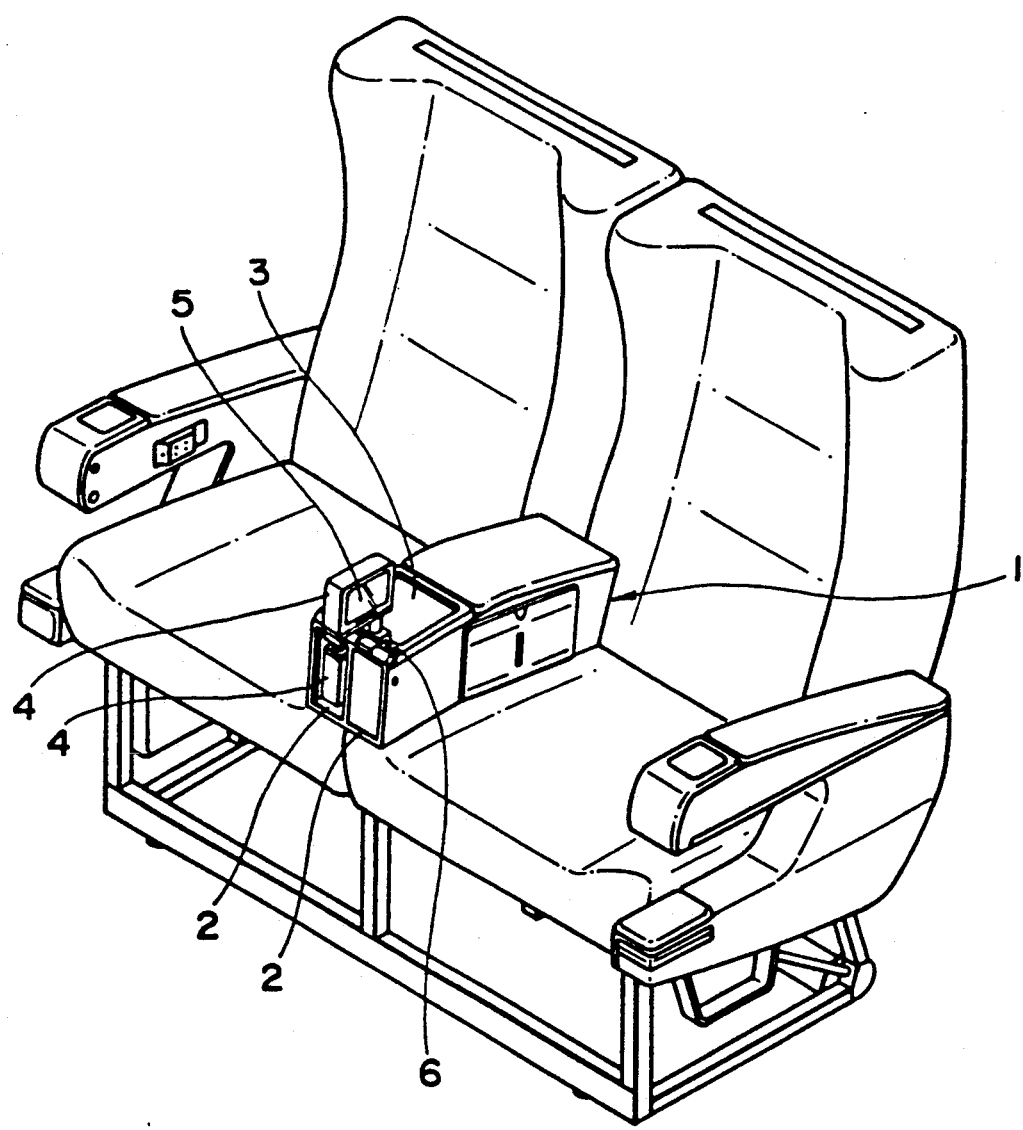
FIG. 1 is a perspective view of an armrest holding a television set taken out from the armrest.

FIGS. 1 to 3 shows an armrest 1, i.e., a center armrest, in a preferred embodiment according to the present invention, for a seat to be installed on aircraft or a vehicle, and one of two television sets 4 taken out from the armrest 1. The armrest 1 is provided with two adjoining cavities 2 under a cocktail tray 3 formed in the front portion of its upper wall to house the two television sets 4 each having a comparatively large plate-shaped liquid crystal display unit 5. Each television set 4 is held by a hinge mechanism 6 on the armrest 1 so as to be turned into the cavity 2. The television set 4 is provided on one side thereof provided with the display unit 5 with an operating unit 5a including switches, a channel selector key and a volume controller. A control panel provided with switches, a channel selector key, a volume controller and an earphone jack for controlling the television set 4 may be disposed on the side wall of the armrest 1. The control panel may be provided also with switches for controlling a reading light for illuminating a narrow limited area around the person seated on the seat and a call light for requesting the service of a stewardess, which are provided on a general aircraft seat. A retractable pocket 7 for containing small personal effects, such as glasses and a cigarette pack, is provided on the side wall of the armrest 1. An armrest cushion 8 serves also as a cover for covering a container formed in the armrest 1.

Figure 4:
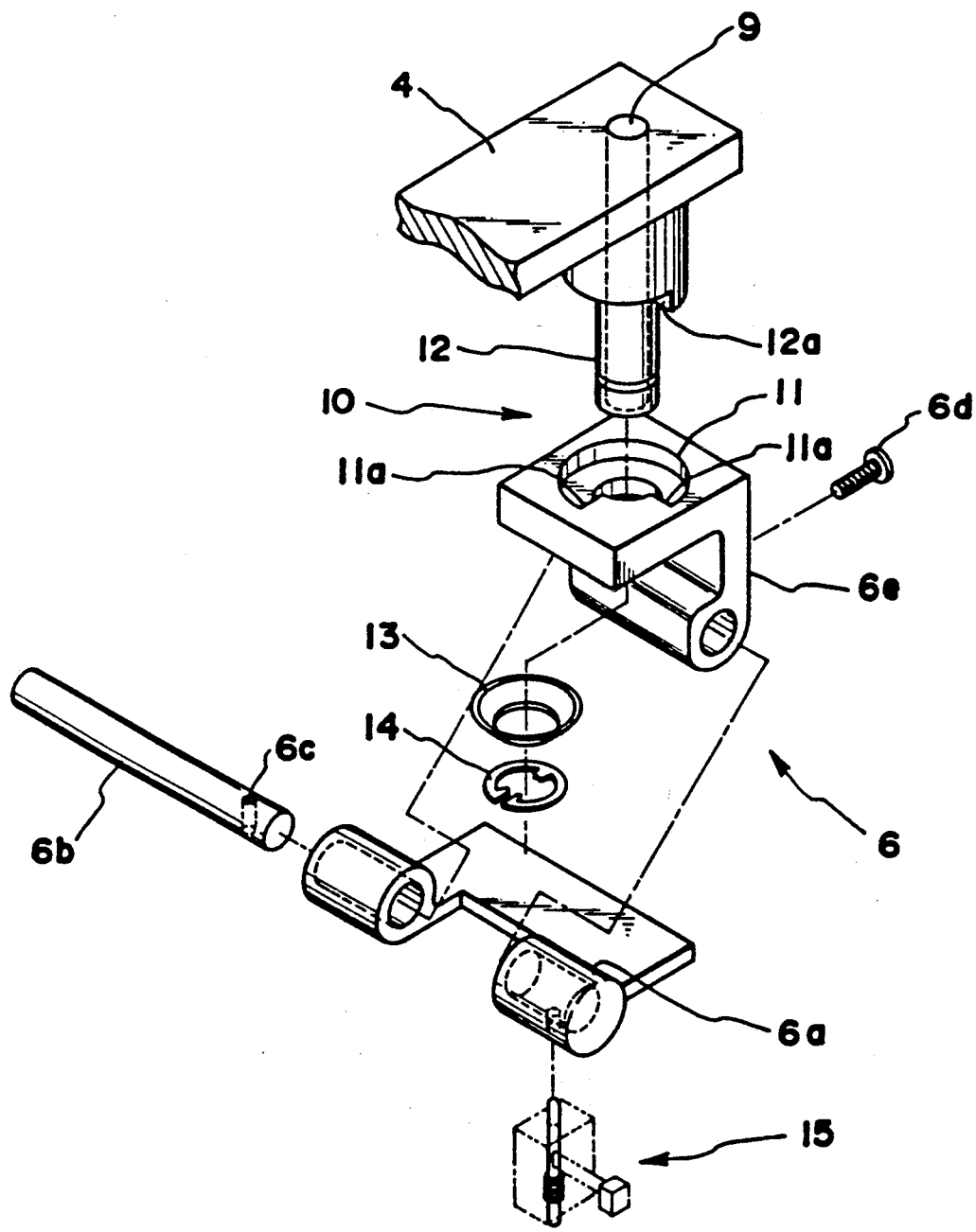
FIG. 4 is an exploded perspective view of a hinge mechanism in a preferred embodiment on which the television set is turned.

Referring to FIG. 4, a hinge mechanism 6 for supporting the television set 4 comprises a knuckle member 6a and a hinge pin 6b. The hinge mechanism 6 is attached to the front upper end of the armrest 1 near the opening of the cavity 2 to support the television set 4 so that the television set 4 can be turned through the opening of the cavity 2 and to secure the television set 4 at a predetermined position. The hinge mechanism 6 is provided with a through hole 9 through which a cable for the television set 4 is passed.

The television set 4 is mounted on a turning unit 10 mounted on the hinge mechanism 6. so that the television set 4 can be turned together with the turning unit 10 in a horizontal plane to adjust its orientation relative to the line of vision of the person seated on the seat. The turning unit 10 comprises a holding member 11 and a shaft 12 extending from the bottom surface of the television set 4. The holding member 11 is provided with a through hole internally provided with stoppers 11a for limiting the angular range of turning of the shaft 12 to about 90°. The shaft 12 is provided an its circumference with stoppers 12a, which engage the stoppers 11a, respectively. The television set 4 can be turned on the shaft 12 in the angular range of about 90° between a housing position, where the front surface of the television set 4 extends in parallel to the side walls of the cavity 2, and a operating position, where the front surface of the television set 4 extends substantially perpendicularly to the side walls of the cavity 2. The positional relation between the holding member 11 and the shaft 12 may be reversed. A disk spring 13 is put on the shaft 12 to secure the shaft 12 on the holding member 11 so that the television set 4 may not swing. A snap ring 14 is put on the shaft 12 to secure the shaft 12 in place on the holding member 11.

Figure 5:
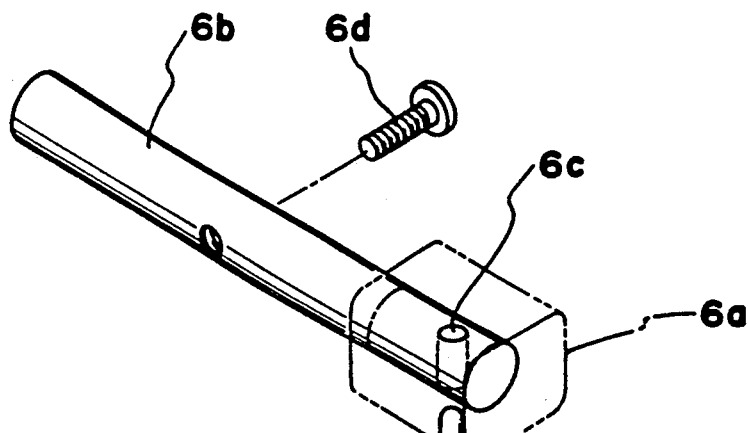
FIG. 5 is a perspective view of an essential portion of a locking mechanism.

Referring to FIG. 5, a locking mechanism 15 for locking the television set 4 at either the housing position or the operating position by inserting a locking pin 15a through the knuckle part of the knuckle member 6a of the hinge mechanism in a through hole 6c formed in one end of the hinge pin 6b. The hinge pin 6b is fastened to the knuckle part 6e of the holding member 11 with a screw 6d.

Figure 6:
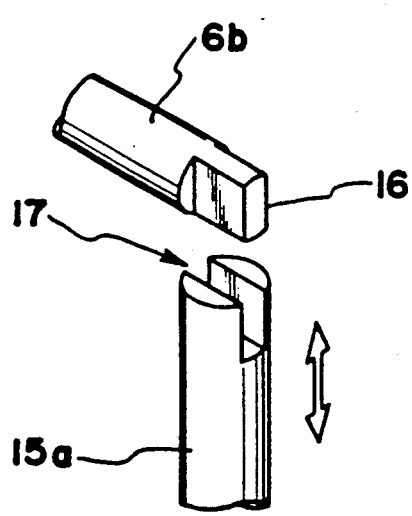
FIGS. 6 and 7 are perspective views of essential portions of the other locking mechanisms.
Figure 7:
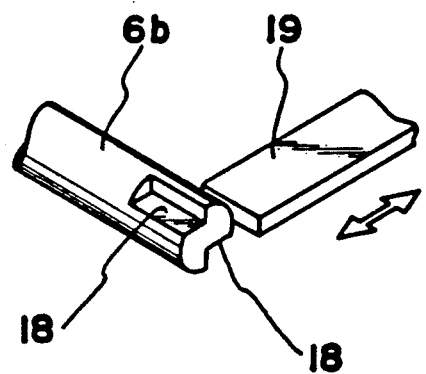

FIG. 6 shows a locking mechanism in another embodiment. This locking mechanism comprises the hinge pin 6b of the hinge mechanism 6, provided at one end thereof with a tongue 16, and a locking pin 15a provided in its extremity with a narrow axial slot 17 for receiving the tongue 16. FIG. 7 shows a locking mechanism in a further embodiment. This locking mechanism comprises the hinge pin 6b of the hinge mechanism 6, provided at one end thereof with a pair of diametrically opposite recesses 18, and a stopper plate 19 capable of engaging either recess 18, provided on the knuckle member 6a.

FIGS. 8 to 14 shows hinge mechanisms in further embodiments each provided with a friction mechanism for making the television set 4 turn downward at a controlled turning speed when the hinge mechanism 6 is released from the locking mechanism to protect the television set 4 from being damaged by shocks.

Figure 8:
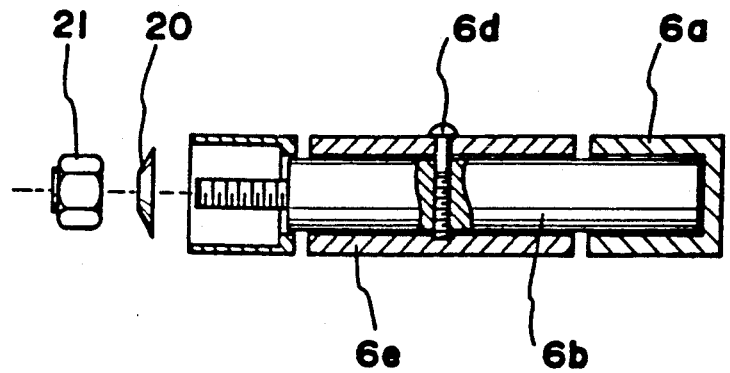
FIG. 8 is a sectional view of an essential portion of a hinge mechanism incorporating a friction mechanism employing a disk spring.

A hinge mechanism 6 shown in FIG. 8 is combined with a friction mechanism comprising a disk spring 20 put on the hinge pin 6b of the hinge mechanism 6, and an adjusting nut 21 for adjusting torque applied to the hinge pin 6b by the disk spring 20. The downward turning speed of the television set 4 can optionally be adjusted by adjusting the fastening force of the disk spring 20 by the adjusting nut 21.

Figures 9, 10:
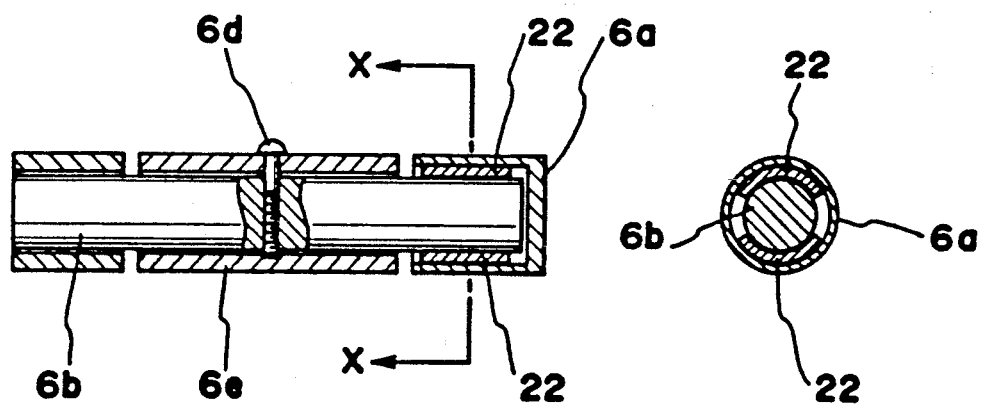
FIG. 9 is a sectional view of an essential portion of a hinge mechanism incorporating a friction mechanism employing a plate spring.
FIG. 10 is a sectional view taken on line X—X in FIG. 9.

A hinge mechanism 6 shown in FIGS. 9 and 10 is combined with a friction mechanism comprising one or a plurality of curved plate springs 22 provided within the knuckle part of the knuckle member 6a of the hinge mechanism 6 so as to press themselves against the circumference of the hinge pin 6b.

Figure 11:
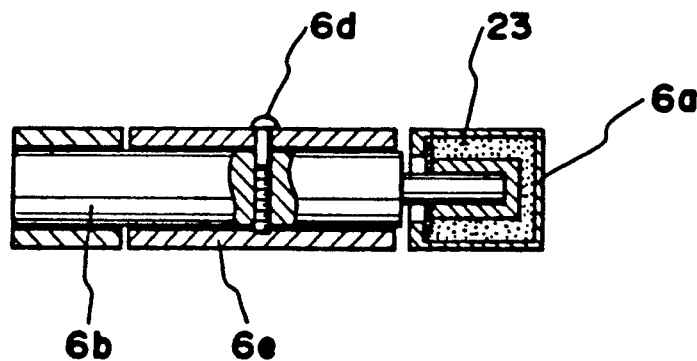
FIG. 11 is a sectional view of an essential portion of a hinge mechanism incorporating a friction mechanism employing a liquid having a high viscosity.

A hinge mechanism 6 shown in FIG. 11 is combined with a friction mechanism comprising the knuckle of the knuckle member 6a filled with a liquid 23 having a high viscosity, such as a silicone material or fixedly and internally provided with a friction member formed of an elastic rubber or a synthetic resin to apply frictional force to one end of the hinge pin 6b received in the knuckle of the knuckle member 6a.

Figure 12:
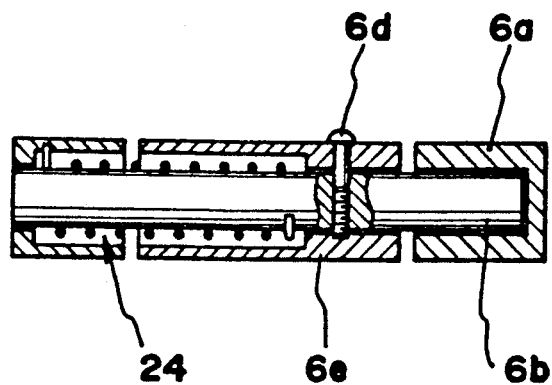
FIG. 12 is a sectional view of an essential portion of a hinge mechanism incorporating a friction mechanism employing a coil spring.

A hinge mechanism 6 shown in FIG. 12 is combined with a friction mechanism comprising a coil spring 24 mounted on the hinge pin 6a of the hinge mechanism 6 within the knuckle part of the knuckle member 6a and having one end engaging the hinge pin 6b and the other end engaging the knuckle member 6a. As the hinge pin 6b turns, the coil spring 24 exerts frictional effect.

Figure 13:
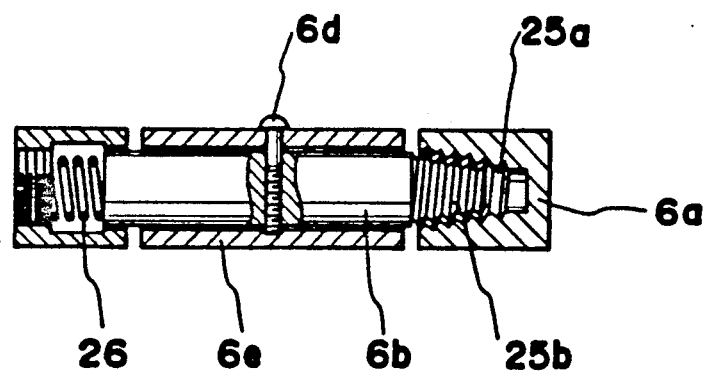
FIG. 13 is a sectional view of an essential portion of a hinge mechanism in a preferred embodiment incorporating a friction mechanism employing a hinge pin provided with a threaded portion.

A hinge mechanism shown in FIG. 13 is combined with a friction mechanism comprising the knuckle part of the knuckle member 6a of the hinge mechanism 6, provided with an internal tapered thread 25a, the hinge pin 6b having one end provided with an external tapered thread 25b mating with the internal tapered thread 25a of the knuckle part of the knuckle member 6a, and an elastic member 26, such as a coil spring, provided contiguously with the other end of the hinge pin 6b to bias the hinge pin 6b axially so that the external tapered thread 25b engages the internal tapered thread 25a. When the hinge pin 6b is turned, together with the knuckle part 6e of the holding member 11, in a direction to make the external tapered thread 25b of the hinge pin 6b thread into the internal tapered thread 25a of the knuckle part of the knuckle member 6a, the hinge pin 6b moves slightly toward the knuckle part of the knuckle member 6a and thereby the compression of the elastic member 26 by the hinge pin 6b is reduced to reduce the frictional resistance, so that the television set 4 can be turned upward through the opening of the cavity 2. When the hinge pin 6b is turned in a direction to make the external tapered thread 25b of the hinge pin 6b unthread from the internal tapered thread 25a, the hinge pin 6b moves slightly toward the elastic member 26 and thereby the compression of the elastic member 26 is increased to make the frictional resistance effective, so that the television set 4 turns downward at a controlled turning speed.

Figure 14:
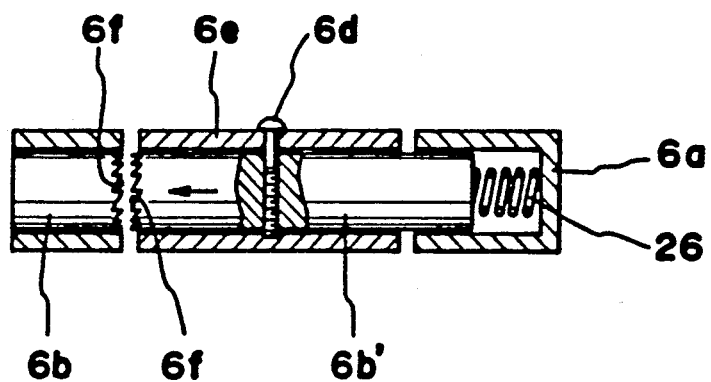
FIG. 14 is a sectional view of an essential portion of a hinge mechanism incorporating a friction mechanism employing a hinge pin provided with a cam.

A hinge mechanism 6 shown in FIG. 14 is combined with a friction mechanism comprising the hinge pin 6b of the hinge mechanism 6, provided on its one end received in the knuckle part of the knuckle member 6a of the hinge mechanism 6 with a face cam 6f for checking rotation in one direction, another hinge pin 6b' fixed to the knuckle part 6e and provided on its one end facing the hinge pin 6b with a face cam 6f similar to the face cam 6f of the hinge pin 6b so that the face cams 6f are engaged, and an elastic member 26, such as a spring, pressing the hinge pin 6b' axially toward the hinge pin 6b so that the face cam 6f of the hinge pin 6b and the face cam 6f of the hinge pin 6b' are engaged within the knuckle part of the knuckle member 6a. When the television set 4 is turned downward, namely, in a direction to make the face cams 6f engage, the frictional resistance is effective. When the television set 4 is turned upward to take out the same from the cavity 2, namely, in a direction to make the face cams 6f disengage, the friction resistance is ineffective, and hence the television set 4 can easily be taken out from the cavity 2.

Figure 15:
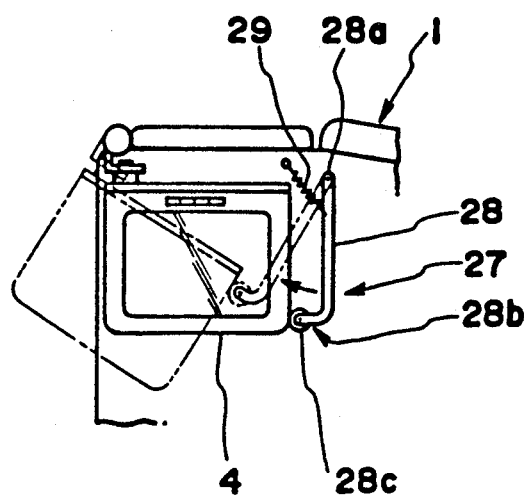
FIG. 15 is a schematic view of a television set pushing-out mechanism in a preferred embodiment.

Referring to FIG. 15, a pushing mechanism 27 for pushing out the television set 4 from the cavity 2 comprises a substantially L-shaped swing member 28 having one end 28a pivotally supported on the side wall of the cavity 2 and the other end 28b rotatably supporting a roller 28c for pushing the television set 4, and an elastic member 29, such as a spring, extended between the wall of the cavity 2 and the swing member 28 so as to urge the roller 28c toward the opening of the cavity 2. When the television set 4 is released from the locking mechanism 15, the pushing mechanism 27 pushes out the television set 4 from the cavity 2.

The pushing mechanism 27 functions also for absorbing shocks that may act on the television set 4 when the television set 4 is allowed to turn downward in housing the same in the cavity 2.

Figure 16:
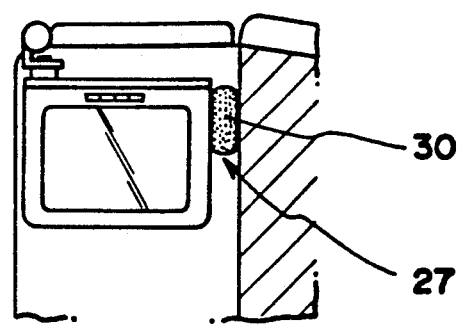
FIG. 16 is a schematic view of a television set pushing-out mechanism in another embodiment.

A pushing mechanism 27 in another embodiment shown in FIG. 16 comprises a cushion member 30, such as a sponge block. The pushing mechanism 27, similarly to the pushing mechanism 27 shown in FIG. 15, functions for pushing out the television set 4 from the cavity 2 and absorbing shocks that may act on the television set 4 in housing the same in the cavity 2.

Figure 17:
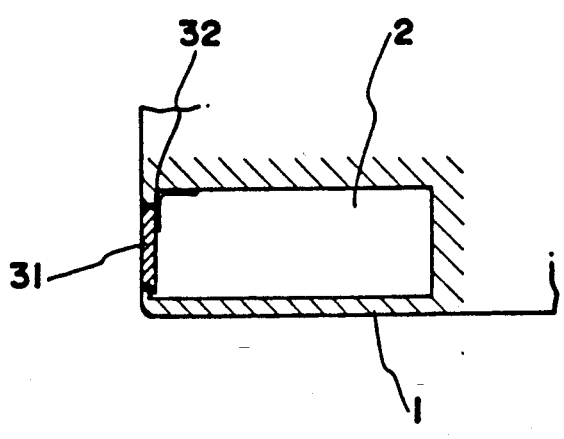
FIGS. 17 and 18 are schematic sectional plan view of a protective cover.
Figure 18:
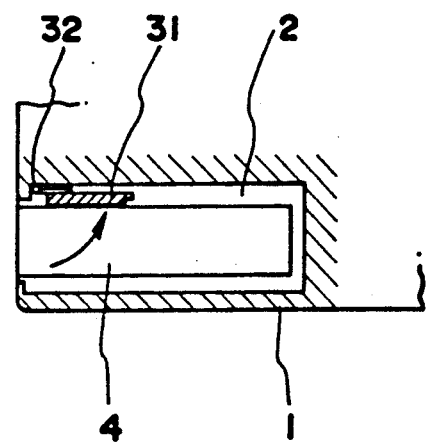

FIGS. 17 and 18 show a protective cover 31 supported by a spring hinge 32 for opening in on the armrest 1 so as to close the opening of the cavity 2 to protect the television set 4 housed in the cavity 2.

A manner of using the television set 4 incorporated into the armrest 1 in accordance with the present invention will be described hereinafter.

In setting the television set 4 for enjoying television, the locking mechanism 15 is operated to release the television set 4, so that the television set 4 is pushed out of the cavity 2 through the opening by the pushing mechanism 27. The television set 4 is turned upward on the hinge mechanism 6 by hand through an angle of about 180°, and then the hinge pin 6b is locked in place by the locking mechanism 15. Then, the television set 4 is turned horizontally in a desired direction on the turning unit 10 to direct the display unit 5 of the television set 4 toward the person seated on the seat. After the television set 4 has been taken out from the cavity 2 and has been moved to the operating position, the protective cover 31 closes the opening of the cavity automatically.

In housing the television set 4 in the cavity 2, the television set 4 is turned on the turning unit 10 to set the television set 4 with its front side in parallel to the side wall of the cavity 2, the locking mechanism 15 is operated to release the hinge pin 6b, and then the television set 4 is turned gradually downward and is pushed into the cavity 2. While the television set 4 is being turned downward, the friction mechanism prevents the sudden drop of the television set 4, so that the television set 4 is not subjected to shocks. After the television set 4 has been housed perfectly in the cavity 2, the locking mechanism 15 locks the television set 4 automatically in place to check the accidental movement of the television set 4 in the cavity 2.

Figure 19:
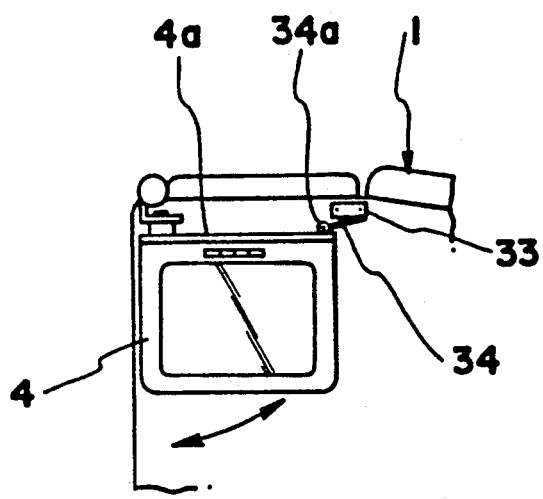
FIGS. 19 to 21 are illustrations of assistance in explaining a power supply disconnecting mechanism for automatically turning power off when the television set is returned into the cavity.
Figure 20:
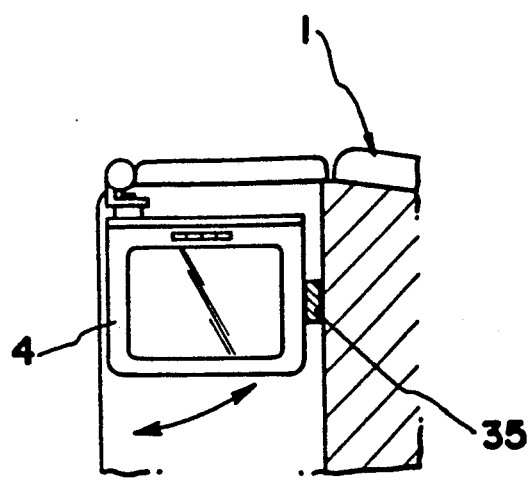
Figure 21:
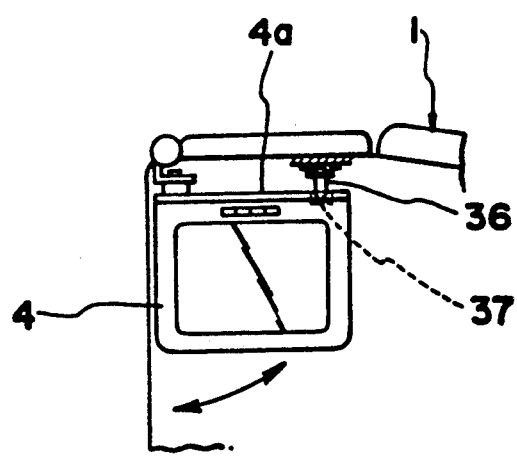

FIGS. 19 to 21 show disconnecting devices for automatically disconnecting the television set 4 from the power supply when the television set 4 is housed in the cavity 2.

A disconnecting device shown in FIG. 19 employs a sensitive switch 33. The sensitive switch 33 is attached to the upper wall of the cavity 2 of the armrest 1, and the actuator 34 of the sensitive switch 33 is biased downward so that the extremity 34a of the actuator 34 of the sensitive swatch 33 is depressed by the bottom surface 4a of the television set 4 as housed in the cavity 2 to open the sensitive switch 33 to disconnect the television set 4 from the power supply. When the television set 4 is taken out from the cavity 2, the actuator 34 is release free to close the sensitive switch 33 to connect the television set 4 to the power supply. Thus, the television set 4 is disconnected from the power supply when not in use to save power.

A disconnecting device shown in FIG. 20 employs a proximity switch 35. The proximity switch 35 is disposed in the depth of the cavity 2 of the armrest 1 to disconnect the television set 4 from the power supply when the same is housed in the cavity 2 and to connect the television set 4 to the power supply when the same is taken out from the cavity 2.

A disconnecting device shown in FIG. 21 employs a switch 37 buried in the bottom wall 4a of the television set 4, and an actuator 36 projected from the upper wall of the cavity 2 so as to operate the switch 37 when the television set 4 is housed in the cavity 2.

Figure 22:
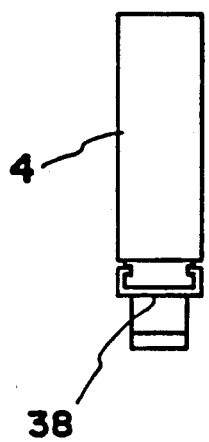
FIG. 22 is a side elevation of a detachable television set.
Figure 23:
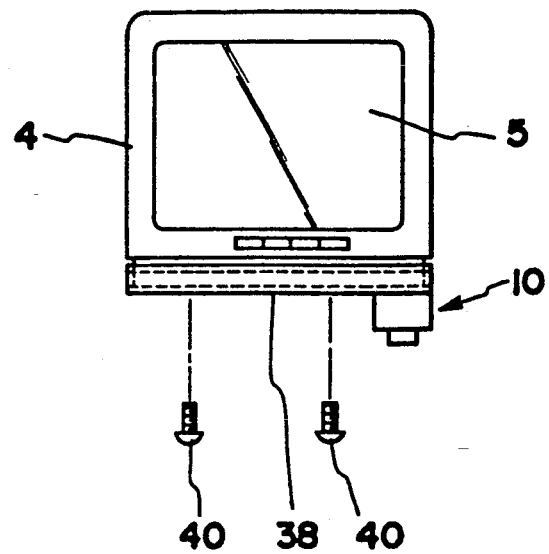
FIG. 23 is a front elevation of the detachable television set of FIG. 22.
Figure 24:
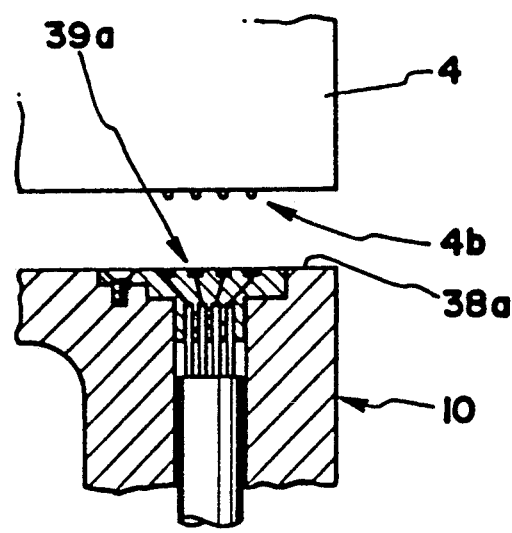
FIG. 24 is a sectional front view of an essential portion of a circuit connector.

FIGS. 22 to 25 show electrical connecting mechanisms for electrically connecting the television set 4 to the power supply and the video source provided in the armrest 1. An electrical connecting mechanism shown in FIGS. 22 to 24 is used for connecting a replaceable television set 4 to the power supply and the video source. The television set is mounted in sliding engagement on a television set holder 38 attached to the upper end of the turning unit 10. Retractable contacts 4b provided on the bottom wall of the television set 4 are brought into contact with contacts 39a provided in the sliding surface 38a of the television set holder 38 when the television is put in place on the television holder 38. In case the television set 4 malfunctions, the television set 4 can readily be removed from the television set holder 38 by unfastening screws 40 to replace the television set 4 with a new one.

Figure 25:
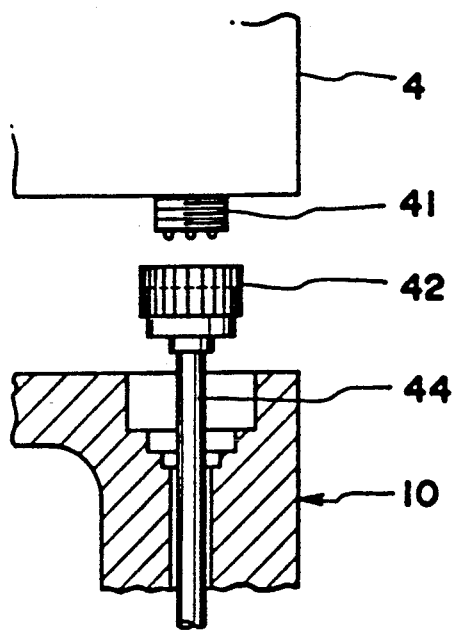
FIG. 25 is a sectional front view of an essential portion of another circuit connector.
Figure 26:
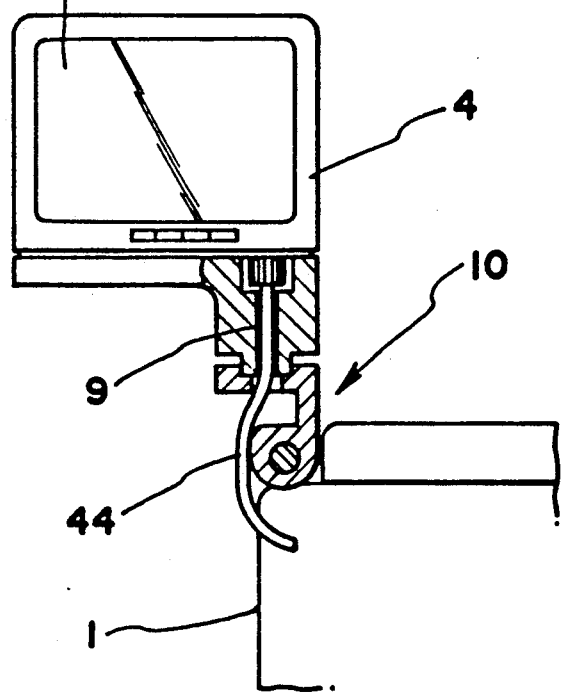
FIG. 26 is an illustration of assistance in explaining the circuit connector of FIG. 25.
Figure 27:
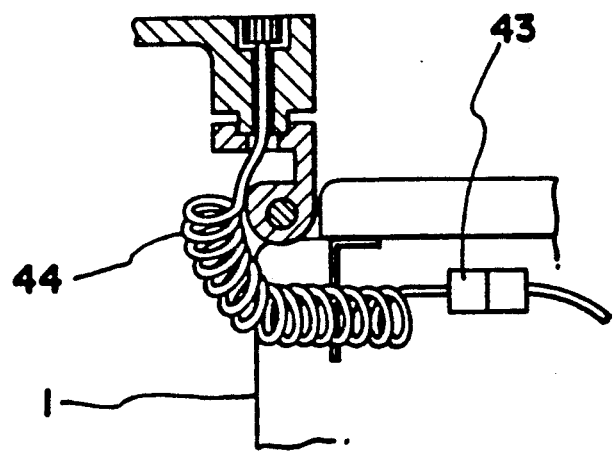
FIG. 27 is an illustration of assistance in explaining the connection of the television set to the power supply.

FIG. 25 shows a electrical connecting mechanism for connecting a replaceable television set 4 to the power supply and the video source. The electrical connecting mechanism has a male connector 41 attached to the bottom surface of the television set 4, and a female connector 42 attached to the turning unit 10. The male connector 41 is plugged into the female connector 42 and is fastened to the female connector 42 with a lock nut. As shown in FIG. 26, a cable 44 connected to the female connector 42 is extended through the through hole 9 of the turning unit 10 and the armrest 1. The cable 44 may be wound in helical coils as shown in FIG. 27, the free end of the cable 44 may be fastened to the upper wall of the cavity 2, and a connector 43 may be provided in the armrest 1. When so extended, the cable 44 is not strained excessively in turning the television set 4 relative to the hinge mechanism 6, and the cable 4 is not exposed.

A support mechanism, not shown, such as a ball-and-socket mechanism, may be provided on the hinge mechanism 6 instead of the turning unit 10 to enable the television set 4 to turn in both a horizontal plane and a vertical plane and to enable the same to be secured in a desired position.

Furthermore, it is also possible to provide a slide plate, not shown, on the bottom surface of the television set 4 so as to extend over the entire area or a portion of the bottom surface of the television set 4, to provide a slide rail along which the slide plate slides, and to attach a portion of the lower part of the the slide rail to the upper end of the turning unit 10. The slide plate and the slide rail thus arranged enables the television set 4 to slide along the slide rail to a position right in front of the person seated on the seat to enable the person to enjoy the television displayed on the display unit 5 of the television set 4 sitting in a further easy position.

Still further, the turning unit 10 may be provided with a clutch and a frictional holding mechanism, not shown, to enable the television set 4 to be lifted up lightly and to counterbalance the total weight of the television set 4 and the accessories so that the television set 4 is not allowed to drop suddenly in putting away the television set 4.

The armrest in accordance with the present invention for a seat is capable of housing a television set having a large display unit, capable of readily directing and securing the television set in an optimum position for the person seated on the seat, and capable of the fine adjustment of the position and tilt of the television set.

The hinge mechanism provided with the friction mechanism prevents the television set from dropping accidentally, so that the malfunction of the television set is prevented.

Furthermore, since the television set can be housed in the cavity, the person seated on the seat is able to use the large collapsible table which can be retracted into to the armrest and, naturally, the cocktail tray while the person is enjoying television on the television set.

FIELD OF EXPLOITATION IN INDUSTRY

The armrest in accordance with the present invention capable of housing a television set is applicable to seats to be installed on aircraft, railway rolling stocks and automobiles including buses. The armrest is able to house the television set when the same is not used and to secure the television set on its front upper part when the same is used. Thus, the armrest of the present invention improves the quality of the seat.

What is claimed is:

1. An armrest for a seat to be installed on an aircraft or a vehicle, capable of housing a television set, comprising:

an armrest body provided with a cavity in a front end thereof and under a cocktail tray to house the television set;

a hinge mechanism provided with a turning unit, said hinge mechanism being attached to an upper front end of the armrest body for swinging the turning unit in a direction parallel to a length of the armrest between first and second positions into and out of the cavity; and a television set mounted on the turning unit, said turning unit being turnable between said second position and a third position facing a user sitting in the seat, said turning unit and hinge moving said set between the first and third positions without interfering with persons sitting next to the user.

2. An armrest for a seat, capable of housing a television set according to claim 1, wherein the hinge mechanism is provided with a friction mechanism, the friction mechanism comprising a first hinge pin provided with first cam means on one end thereof received in a knuckle of a knuckle member of the hinge mechanism, a second hinge pin provided on an end thereof opposite the first cam means with second cam means engaging the first cam means, and an elastic member axially urging one of the first and second hinge pins toward the other.

3. An armrest for a seat, capable of housing a television set according to claim 1, wherein said hinge mechanism further comprises:

a first knuckle member fixedly attached to a front upper end of the armrest, a second knuckle member fixedly attached to the television set, and a hinge pin rotatably fastening the first and second knuckle members together.

4. An armrest for a seat, capable of housing a television set according to claim 3, wherein the hinge mechanism further includes a locking mechanism for releasably securing the television set at the first and second positions.

5. An armrest for a seat, capable of housing a television set according to claim 4, wherein said locking mechanism comprises a locking pin releasably insertable into a through hole in said hinge pin, said locking pin securing the set at the first position when the locking pin is inserted into one end of the through hole and at the second position when inserted into an opposite end of the through hole.

6. An armrest for a seat, capable of housing a television set according to claim 4, wherein the locking mechanism comprises a tongue provided at one end of the hinge pin releasably engageable with a narrow axial slot in a locking pin.

7. An armrest for a seat, capable of housing a television set according to claim 4, wherein the hinge pin has a pair of diametrically opposite recesses on one end thereof, and wherein said locking mechanism includes a stopper plate releasably engageable with said pair of recesses to secure the set at the first and second positions.

8. An armrest for a seat capable of housing a television set according to claim 1, wherein the hinge mechanism is provided with a friction mechanism for retarding the speed at which the set swings about an axis of a hinge pin in the hinge mechanism.

9. An armrest for a seat, capable of housing a television set according to claim 8, wherein the friction mechanism comprises a disk spring put on the hinge pin of the hinge mechanism, and a nut screwed on the hinge pin to adjust the compression of the disk spring.

10. An armrest for a seat, capable of housing a television set according to claim 8, wherein the friction mechanism comprises at least one curved plate spring placed within the knuckle of a knuckle member of the hinge mechanism so as to press on the circumference of the hinge pin of the hinge mechanism.

11. An armrest for a seat, capable of housing a television set according to claim 8, wherein the friction mechanism comprises a liquid having a high viscosity and filling a knuckle of a knuckle member of the hinge mechanism to apply resistance to turning the hinge pin of the hinge mechanism.

12. An armrest for a seat, capable of housing a television set according to claim 8, wherein the friction mechanism comprises a coil spring wound around the hinge pin of the hinge mechanism in a knuckle of a knuckle member of the hinge mechanism and having one end engaging the hinge pin and the other end engaging the knuckle of the knuckle member.

* * * * *